US011269635B1

(12) United States Patent
Lemoine

(10) Patent No.: US 11,269,635 B1
(45) Date of Patent: Mar. 8, 2022

(54) HARDWARE EFFICIENT STATISTICAL MOMENT COMPUTATION

(71) Applicant: Accenture Global Solutions Limited, Dublin (IE)

(72) Inventor: Eric Tristan Lemoine, San Marcos, CA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/075,140

(22) Filed: Oct. 20, 2020

Related U.S. Application Data

(60) Provisional application No. 62/923,953, filed on Oct. 21, 2019.

(51) Int. Cl.
*G06F 9/30* (2018.01)
*G06F 9/50* (2006.01)

(52) U.S. Cl.
CPC .......... *G06F 9/3013* (2013.01); *G06F 9/3001* (2013.01); *G06F 9/5011* (2013.01); *G06F 9/5072* (2013.01)

(58) Field of Classification Search
None
See application file for complete search history.

(56) References Cited

U.S. PATENT DOCUMENTS

| 5,210,820 | A | * | 5/1993 | Kenyon | G06K 9/00496 704/200 |
|---|---|---|---|---|---|
| 6,038,584 | A | * | 3/2000 | Balmer | G06F 9/30032 709/248 |
| 7,251,581 | B2 | * | 7/2007 | Nassif | G01R 31/31718 702/179 |
| 8,078,835 | B2 | * | 12/2011 | Yang | G06F 7/57 712/16 |
| 2006/0117240 | A1 | * | 6/2006 | Novichkov | H03M 13/116 714/758 |

(Continued)

OTHER PUBLICATIONS

Kalson.S., Yao,K., Systolic array processing for order and time recursive generalized least-squares estimation, 1986,Proc. SPIE, pp. 27-38. (Year: 1986).*

(Continued)

*Primary Examiner* — Eric Coleman
(74) *Attorney, Agent, or Firm* — Fish & Richardson P.C.

(57) ABSTRACT

The document generally describes hardware for computing multiple orders of statistical moments. In one aspect, a system includes multiple stages of compute units. A first stage includes a first sequence of compute units includes a first compute unit configured to compute a first raw statistical moment for a first portion of data points in the time series of data points and one or more first additional compute units that are each configured to compute a respective first statistical moment for the first portion of data points. Each additional stage includes a second sequence of compute units for computing statistical moments for a respective second portion of the time series of data points. Each additional stage includes a second compute unit configured to compute the first raw statistical moment for the respective second portion of the time series of data points and one or more second additional compute units.

20 Claims, 9 Drawing Sheets

(56) References Cited

U.S. PATENT DOCUMENTS

| | | | |
|---|---|---|---|
| 2010/0214308 A1* | 8/2010 | Shishido | G06T 1/20 345/589 |
| 2011/0019907 A1* | 1/2011 | Shi | H04N 19/60 382/159 |
| 2013/0253888 A1* | 9/2013 | Yang | G06F 17/18 703/2 |
| 2015/0046897 A1* | 2/2015 | Shebaita | G06F 30/30 716/136 |
| 2016/0349832 A1* | 12/2016 | Jiao | G06F 1/3275 |
| 2019/0260572 A1* | 8/2019 | Stupakov | G06F 21/556 |

OTHER PUBLICATIONS

Aloqeely, M.A. etal., A new approach for computing higher-order moments on linear systolic arrays, 1998,Can J. Elect. & Comp. Eng. vol. 23, No. 3, pp. 127-131. (Year: 1998).*

Benn. A. et al., Massively parallel computing : a statistical application, 1998, Kluwer Academic Publishers Statistics and Computing 8, pp. 309-318. (Year: 1998).*

Goldberg, "What Every Computer Scientist Should Know About Floating-Point Arithmetic," ACM Computing Surveys, Mar. 1991, 23(1):5-48.

* cited by examiner

```
Algorithm 1 Stage zero of S.U.R.E.
─────────────────────────────────────────────────────────────────
procedure STAGELAYERZERO(p,x)              ▷ p: highest moment processed x: new data-point
Require: β, β = 0 at initialization.
Require: M_loc[1,...,p], M_out = {0,...,0} at initialization.  ▷ In this example p = 2 is shown.
    if β = 0 then
        M_loc[1] ← x
        β ← 1                                                   ▷ Toggle β
        Write β, x                                              ▷ Write to an implicit FIFO associated with stage zero.
    else
        δ ← x − M_loc[1]
        M_out[1] ← M_loc[1] + ½δ
        M_out[2] ← 0.5δ²
        ...                                                     ▷ if p greater than 2 compute the even moments M^{2q} = 2¹⁻²ᑫ δ²ᑫ, q ∈ [2,p/2], odd moments are null.
        β ← 0                                                   ▷ Toggle β
        Write β, x
        STAGELAYERB(1,p,M_out[1,...,p])                         ▷ Call the stage 1.
    end if
end procedure
─────────────────────────────────────────────────────────────────
```

FIG. 5

Algorithm 2 Stage $b$ of binary S.O.R.E.

```
procedure STAGELAYERB(b, p, M_in[1,...,p])        ▷ b level of the stage, p: highest moment processed M_in[1,...,p]: new
                                                    data-point
Require: β, β̃ = 0 at initialization.
Require: M_in[1,...,p], M_out = {0,...,0} at initialization.   ▷ In this example p = 2 is shown.
  if β̃ = 0 then
    M_in[1,...,p] ← M_in[1,...,p]
    β̃ ← 1                                          ▷ Toggle β̃
    Write β, M_out[1,...,p]                        ▷ Write to an implicit FIFO associated with stage b.
  else
    δ ← M_in[1] − M_out[1]
    M_out[1] ← M_out[1] + ½δ
    M_out[2] ← M_out[2] + M_out[2] + 2^{k−1}δ²     ▷ See equation (32a)
    ...                                             ▷ See equation (32b)
    β̃ ← 0                                          ▷ Toggle β̃
    Write β, M_out[1,...,p]                        ▷ if p greater than 2 compute M^q, q ∈ [3, p]
    STAGELAYERB(b + 1, p, M_out[1,...,p])         ▷ Call stage b + 1
  end if
end procedure
```

HARDWARE EFFICIENT STATISTICAL MOMENT COMPUTATION

CROSS REFERENCE TO RELATED APPLICATIONS

This application claims the benefit under 35 U.S.C. § 119(e) of U.S. Patent Application No. 62/923,953, entitled "HARDWARE EFFICIENT STATISTICAL MOMENT COMPUTATION," filed Oct. 21, 2019. The disclosure of the foregoing application is incorporated herein by reference in its entirety for all purposes.

TECHNICAL FIELD

This specification relates to hardware and techniques for efficiently computing statistical moments.

BACKGROUND

A statistical moment is a quantitative measure of a set of data, e.g., a set of time series data. For example, a first moment may be the mean of the values in the set of data, the second moment may be the variance of the values, and so on.

SUMMARY

This specification generally describes systems, methods, apparatus, and techniques for computing statistical moments. A computation component can include multiple stages, e.g., multiple layers. Each stage can include, for each order of statistical moment computed for a time series of data points, a compute unit that computes the statistical moment of that order. The stages can be arranged in a cascaded manner such that the compute units of a stage passes the computed statistical moments to the compute units that compute higher order moments in that stage and to registers of corresponding compute units of the next stage. In this way, each subsequent stage can compute the same order statistical moment for a larger number of data points in the data series without having to revisit any of the individual data points.

In general, one innovative aspect of the subject matter described in this specification can be embodied in systems that include multiple stages of compute units, including: a first stage that includes a first sequence of compute units including: a first compute unit configured to compute a first raw statistical moment for a first portion of data points in the time series of data points; and one or more first additional compute units that are each configured to compute a respective first statistical moment for the first portion of data points, wherein the respective first statistical moment computed by each first additional compute unit is one order higher than the respective first statistical moment computed by a previous compute unit in the first stage; and one or more additional stages, wherein each additional stage includes a second sequence of compute units for computing statistical moments for a respective second portion of the time series of data points, each additional stage including: a second compute unit configured to compute the first raw statistical moment for the respective second portion of the time series of data points; and one or more second additional compute units that are each configured to compute a respective second statistical moment for the respective second portion of the data points, wherein the respective second statistical moment computed by each second additional compute unit is one order higher than the respective second statistical moment computed by a previous compute unit in the additional stage. A number of data points in the respective second portion of data points for each additional stage is greater than a number of data points in the first portion of data points and a number of data points in each respective second portion of data points of each previous additional stage.

Other embodiments of this aspect include corresponding methods, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some aspects, each statistical moment of the first stage that has an odd order greater than one is always null. Each compute unit of the first stage can output a respective statistical moment computed by the compute unit to a corresponding compute unit of a next stage of the one or more additional stages. Each compute unit of the next stage computes a statistical moment using the first statistical moment received from the corresponding compute unit.

In some aspects, each additional stage includes multiple registers that include, for each compute unit of the additional stage, a first register configured to store a most recent statistical moment received from a corresponding compute unit of a previous stage and a second register configured to store a second most recent statistical moment received from the corresponding compute unit of the previous stage, wherein the second most recent statistical moment was received immediately prior to the most recent statistical moment. Each compute unit of the additional stage can be configured to compute a respective statistical moment using the most recent statistical moment stored in the first register and the second most recent statistical moment stored in the second register. Each compute unit of the additional stage that computes a statistical moment having an order of two or higher can be configured to compute the respective statistical moment based on the statistical moment computed the compute unit of the additional stage that computes a next lower statistical moment for the stage.

In some aspects, the first compute unit of the first stage is configured to compute (i) a mean of two data points in the time series and (ii) a difference between the two data points, wherein the mean and difference are used by one or more of the additional compute units in the first cascade.

In some aspects, the second compute unit of the second stage of each additional stage is configured to compute (i) a mean of two data points received from a previous stage and (ii) a difference between the two data points received from the previous stage, wherein the mean and difference are used by one or more of the additional compute units in the second cascade.

In some aspects, each compute unit of each additional stage that computes a statistical moment having an order of two or higher computes the statistical moment using the following equation:

$$M_X^p = M_{X_1}^p + M_{X_0}^p + \sum_{k=1}^{p} \binom{p}{k}(2^{-k}[M_{X_1}^{p-k} + (-1)^k M_{X_0}^{p-k}]\delta_{2,1}^k)$$

where p represents the order of the statistical moment, $X_0$ is a first sub-series of the time series of data points, and $X_1$ is a second subseries of the time series of data points.

In some aspects, each compute unit of each additional stage that computes a statistical moment having an order of two computes the statistical moment using the following equation: $M_{b_{i+1}}{}^2 = M_{b_j,x_1}{}^2 + M_{b_j,x_0}{}^2 + (2^{b_i-1})\delta_{2,1}{}^2$, where $b_i$ represents a level of the additional stage and $\delta_{2,1} = \mu X_1 - \mu X_0$ is a difference between the mean of a second sub-series $X_1$ of the time series of data points and the mean of a second sub-series $X_0$ of the time series of data points received by the additional stage.

In some aspects, a quantity of stages in the multiple stages is based on a largest time period for which statistical moments are computed by the multiple stages. In some aspects, the stages of compute units are arranged such that a quantity of data points for which statistical moments are computed by each stage is a power of two having a particular exponent. The particular exponent of each particular stage is one higher than the particular exponent of an immediate previous stage for the particular stage.

In some aspects, the number of compute units in each stage equals a number of orders of statistical moments computed by each stage. In some aspects, each compute unit of each stage computes a respective statistical moment using hardware components without requiring any floating point division operations.

The subject matter described in this specification can be implemented in particular embodiments so as to realize one or more of the following advantages. A computation component can include cascaded compute units for computing and updating multiple orders of statistical moments for a time series of data points such that individual data points do not have to be stored. This reduces the data storage requirements for storing the data and reduces bandwidth requirements for transmitting the data.

The arrangement of the hardware compute units and the symmetric update techniques used by the compute units require fewer computations, e.g., fewer additions, fewer multiplications, and no division, as compared to other techniques, e.g., incremental update techniques. For example, arrangement of the hardware compute units and the symmetric update techniques used by the compute units enable the computation of higher order statistical moments without the need to revisit individual data points for multiple computations. This results in faster computations and fewer computation resources required to compute the statistical moments. As division is a computationally expensive operation in hardware typically requiring the translation into a series of subtractions and multiplications, e.g., using Newton-Raphon Inverse approach, eliminating the requirement of performing hardware division enables a less complex design and faster statistical computations. In combination with the data storage savings, these computational advantages enables low complexity devices to compute multiple order statistical moments on large time series of data in real time or near real time, which allows such devices to act on anomalies indicated by the data. For example, this enables devices having lower computation power and fewer data storage devices, such as Internet of Things (IoT), Internet of Industrial Things (IoIT) devices or other edge devices, to perform multiple orders of statistical moments at the device rather than sending the data to higher power servers, which enables the devices to trigger alerts or perform corrective actions without waiting for a response from a remote server and even being connected to the remote server.

The arrangement of the compute units in stages also enable parallel computation of the statistical data, which enables faster computation of multiple orders of statistical data for various time periods. This parallel computation combined with the overall reduction of operations (e.g., enabling every even stage to be implemented in hardware using just two adders and one multiplier and each odd stage implementable as six adders and two multipliers) means that the computation component can be implemented using a simple central processing unit (CPU), such as an Advanced RISC Machine (ARM) or relatively simple custom silicon hardware.

The arrangement of the hardware compute units and the symmetric update techniques provide a scalable solution that can be easily adapted to various amounts of data points, various time windows, and various numbers of statistical moments. By having a computation component designed for rolling windows of $2^k$ samples, the computation component can be broken into a number stages based on the number of data points and the time window and each stage can have a number of layers based on the number of statistical moments to be computed by each stage. This allows the computation component to compute statistics for arbitrary spans of data, e.g., if it takes seven stages to manage data that is sampled 128,000 times a second, the time window can be extended from one second to one hour by adding one stage per doubling of the time window. As there are 3600 seconds in an hour and one second doubled 12 times is 4096, it would take 19 stages to move from one second to one hour if it takes seven stages to manage one second's worth of data. The computation component can include 32 stages to increase to a year's worth of data. In other words, the computation component enables the arbitrary increase of time capacity by adding a single stage for each doubling of the time span. For each higher order statistical moment, another layer (e.g., another compute unit) can be added to each stage to compute the higher order statistical moment.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 shows pseudocode for operations performed by a first stage of a computation component.

FIG. 6 shows pseudocode for operations performed by a second stage of a computation component.

FIG. 7 shows pseudocode for other functions performed by a computation component.

Like reference numbers and designations in the various drawings indicate like elements.

DETAILED DESCRIPTION

Figure 1A:
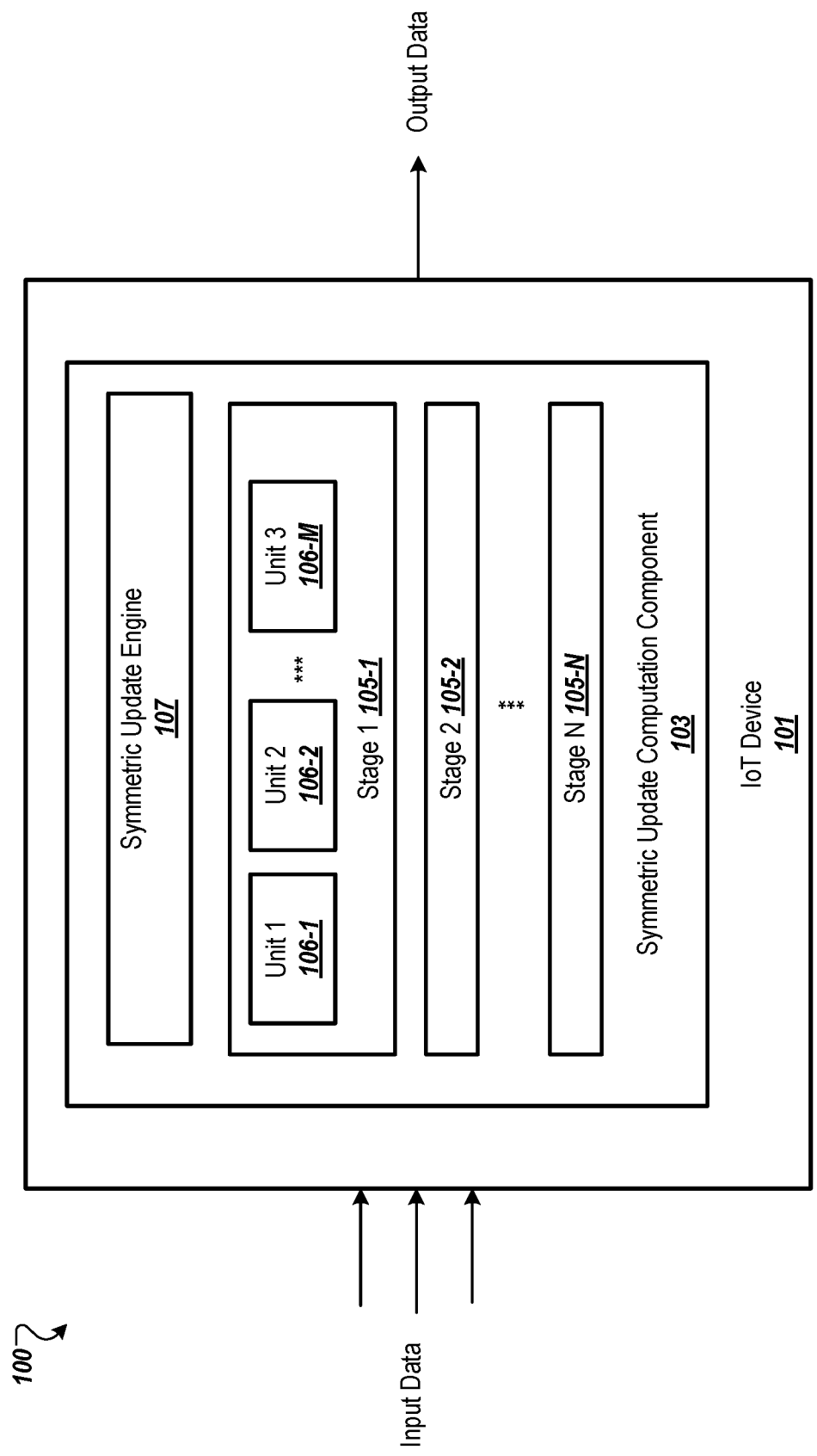
FIG. 1A is an example of an environment in which a computation component of an IoT device computes statistical moments for a time series of data points.

FIG. 1A is an example of an environment 100 in which a symmetric update computation component 103 of an IoT device 101 computes statistical moments for a time series of data points. Although the computation component 103 is described in terms of an IoT device, such as an IoIT device, the computation component 103 can be used in or with other types of devices to compute statistical moments.

The IoT device 101 can receive input data from one or more data sources. The input data can be time series data, e.g., a series of timestamped values or data points that are sent periodically by the data source(s). For example, the IoT device 101 can be a pressure transmitter and/or a pressure controlled valve that receives a time series of pressure measurements from a pressure sensor. In this example, the pressure sensor can provide a pressure measurement once per second or according to another time period.

The symmetric update computation component 103 can compute multiple orders of statistical moments for the time series input data. The symmetric update computation component 103 can use the higher order statistical moments to compute statistical quantities, such as variance, standard deviation, skewness, etc. The capture of extensive time series data and the analysis of this data can provide new insights into the behavior and temporal evolution of the underlying equipment/phenomenon measured. For example, the capture and analysis of such data from IoT devices or edge computing devices and, in particular, IoIT devices can provide new insights into the behavior of these devices.

One significant salient tension in the practical implementation of IoIT in the real world is the cost of capturing and analyzing time series data versus its deferred and hypothesized return on investment (ROI). Targeted industrial equipment can be enhanced with an observation device, an IoT device, in order to record over time key physical parameters characterizing the equipment. In other words, the main cost of IoT—the deployment of the IoT devices—is typically borne upfront. Over a time period of capturing data, e.g., weeks to months, the hypothesized ROI of implementing an IoIT can be validated by analyzing those data. Moreover, the exploitation of the insight needed to generate that ROI will often require on the device real-time analytics to calibrate the actuation performed on the underlying equipment.

On the one hand, in order to produce positive ROI, IoIT generally demands cheap devices, that is, devices with low compute, low memory, low power devices inter-connected through low bandwidth networks. On the other hand, IoIT also demands analytic capabilities with an increasing degree of sophistication. This presents a technical conundrum.

The computation components described in this document, including the computation component 103, can solve this conundrum by presenting an efficient way to compute online, real-time (or near real-time), statistics on time series data, as well as keep a synthetic view at all time scales of the time series past at the cost of few kilobytes (KB) per time series. Moreover, the efficiency is obtained without sacrificing neither the accuracy nor the numerical stability of the algorithms involved, while also being able to be implemented on the sort of low compute, low memory, low power devices inter-connected through low bandwidth networks that are typical of IoIT.

Statistical moments operate over sequences of values. The sequences of values in IoT devices can come from time series data (e.g., a series of time stamped values/data-points).

The mathematical definition of statistical moments of order $p \in \mathbb{N}$ is:

First Raw Moment:

$$\mu = \frac{1}{|X|}\sum_{x \in X} x \tag{1}$$

Moment of order $p$: $M_X^p = E_{x \in X}(x-\mu)^p$ (2)

Covariance: $C_{X,Y}^2 = \Sigma_{x \in X, y \in Y}(x_i - \mu_X)(y_i - \nu_Y)$ (3)

In the above equations, X and Y are sequences of length $|X|=n_x$ and $|Y|=n_y$, respectively.

It can be observed that:

$$M^0 = \Sigma(x-\mu)^0 = \Sigma 1 = n_x \tag{4}$$

In other words, $M^0$ is the length of the underlying sequence.

For each definition of the first raw moment ($\mu$), it can also be observed that:

$$M^1 = \Sigma(x-\mu)^1 = \Sigma x - \mu \Sigma 1 = 0 \tag{5}$$

Classical statistic quantities like Variance/Standard-Deviation, Skewness and Kurtosis can all be calculated based on second, third and fourth order moments. For example, the definition of the Standard-Deviation ($\sigma$) is:

$$\sigma = \sqrt{\frac{M^2}{M^0}} \tag{6}$$

In order to compare/correlate time series, the time series can be zero-normalized (e.g., transformed to a zero mean and unit variance time series) before applying a correlation/comparison technique.

Once $\mu$ and $\sigma$ are computed, the time series data-points can be zero-normalized using the following equation:

$$\hat{x} = \frac{(x-\mu)}{\sigma} \tag{7}$$

In the context of time series data, time gives an order to the values that are processed, and while the equation given above can be seen as time independent, the interpretation of the resulting quantities calculated is not time independent. Therefore, the sequence in which the data-points are being processed needs to be maintained. Also, the very serial nature of data-points capture can require inline techniques to avoid making multiple passes over the time series already collected.

However, a first glance at the definition of the statistical moments, two passes over the data seem necessary: a first pass to compute the first raw moment $\mu$ and a second pass to compute the summation of $(x-\mu)^p$. It would be preferable and more efficient to process multiple statistical moments in one pass. For the second moment (e.g., Variance, $\sigma^2$), the sum of squares equation can be used:

$$\sum_{i=1}^{n}(x_i-\mu)^2 = \left[\sum_{i=1}^{n} x_i^2\right] + \frac{1}{n}\left[\sum_{i=1}^{n} x_i\right]^2 \tag{8}$$

While the above sum of squares equation enables the computation of $\mu$ and the second moment in one pass, it is numerically unstable when implemented with floating point computation (e.g., due to catastrophic cancellation). Also, the sum of squares equation does not generalize gracefully for moments with an order larger than two.

In order to compute multiple orders of moments in one pass over a time series, another approach is needed. It can be observed that if a sequence is divided into two separate sequences X1 and X2, the union of the two sequences X1 and X2 can be computed trivially using the following equation:

$$\mu_{X1 \cup X2} = \frac{(n_1 \mu_{X1} + n_2 \mu_{X2})}{n_1 + n_2} \tag{9}$$

This means that parallel (distributed too) calculation of $\mu$ independent of each other can be performed.

The above formula for the first raw moment μ can be reformulated as:

$$\mu_X = \mu_{X1} + \frac{n_2}{n_1+n_2}(\mu_{X2} - \mu_{X1}) \qquad (10)$$

Using the definition of the moment equation (Equation 2) above and some derivation of terms (in the Derivation section below, the Equation 11 derivation is shown as well as a more general equation with $\mathcal{B}$ sequences), the following general equation for the pairwise addition of all moments above 1 is obtained:

Notation: $\delta_{2,1}=(\mu_{X2}-\mu_{X1})$ and $n=n_1+n_2$.

$$M_X^p = \sum_{k=0}^{p}\binom{p}{k}\left[\left(\frac{n_1}{n}\right)^k M_{X2}^{p-k} + \left(\frac{-n_2}{n}\right)^k M_{X1}^{p-k}\right]\delta_{2,1}^k \qquad (11)$$

At first, Equation 11 may not seem to be simpler to compute than Equation 2 above. However, a deeper look at Equation 11 shows the following advantageous features over Equation 2:

$$\binom{p}{k}$$

the binomial coefficient is independent of μ, n, and $M_X^q$.

For k=0, the terms in the brackets [ ... ] of Equation 11 simplify to $M_{X1}^p + M_{X2}^q$, $M_X^0 = n$, and $M_X^1 = 0$.

For $p = 2 \rightarrow M_X^2 = M_{X1}^2 + M_{X2}^2 + \frac{n_1 n_2}{(n_1+n_2)}\delta_{2,1}^2$ For $p = 3 \rightarrow M_X^3 =$ $$M_{X1}^3 + M_{X2}^3 + \frac{n_1 n_2(n_1-n_2)}{(n_1+n_2)^2}\delta_{2,1}^3 + \frac{3}{(n_1+n_2)}[n_1 M_{X2}^2 - n_2 M_{X1}^2]\delta_{2,1}.$$

If $n_1$ is equal to $n_2$, the terms in the brackets of Equation 11 greatly simplifies with:

$$[\ldots] \rightarrow (2^{-k})[M_{X2}^{p-k} + (-1)^k M_{X1}^{p-k}]$$

Incremental update (i.e., $n_2=1$), the terms $M_{X2}^q = \{1 \; q=0, 0 \; q \neq 0\}$ and $\mu_2 = x$, while $$\mu_{+1} = \mu + \left(\frac{1}{n+1}\right)(x-\mu).$$

$$M_{+1}^p = M^p + \sum_{k=1}^{p-2}\binom{p}{k}\left(\frac{-1}{n+1}(x-\mu)\right)^k M^{p-k} + \qquad (12)$$

$$\left(\frac{1}{n+1}(x-\mu)\right)^p (n^p + n(-1)^p)$$

The incremental update can be used in streaming techniques, e.g., in streaming algorithms. For example, μ and the various order moments can be updated each time a new data point appears in the stream.

Each update increments the sequence by one data point. The term $1/(n+1)$ can be calculated at each update. However, the previous inverse can be used as a starting value for an iterative Newton-Raphson calculation of $1/(n+1)$:

For: $v_0 = 1/n$ and $d = n+1 \rightarrow v_1 = v_0 + v_0(1-dv_0)$

Then iterate $v_{i+1} = v_i + v_i(1-dv_i) + v_i(1-dv_i)^2 [+v_i(1-dv_i)^3]$ until $v_{i+1} = v_i$ In most cases, one iteration should suffice and the term [ ... ] can be omitted depending on the precision desired.

The number of operations involve (only μ, σ and skewness are shown below) and assuming $(n+1)^{-1}$ is computed from $n^{-1}$ is as follows:

| | |
|---|---|
| $v_0 = n^{-1}, v_1 = v_0 + v_0(1-dv_0)$ | 2 additions, 1 subtraction, 2 multiplications |
| Iterate: $v_1 = v_1 + v_1(1-dv_1) + v_1(1-dv_1)^2$ | 2 additions, 1 subtraction, 3 multiplications |
| $\mu_{+1} = \mu + \frac{1}{(n+1)}(x-\mu)$ | 1 addition, 1 subtraction, 1 multiplication |
| $M_{+1}^2 = M^2 + \frac{n}{(n+1)}(x-\mu)^2$ | 1 addition, 0 subtraction, 2 multiplications |
| $M_{+1}^3 = M^3 - 3\frac{(x-\mu)}{(n+1)}M^2 +$ $(n-1)\frac{n}{(n+1)^2}(x-\mu)^3$ | 2 additions, 2 subtractions, 3 multiplications |
| Total: | 8 additions, 5 subtractions, 11 multiplications |

The main drawback of this incremental update technique is the need to perform at least one iteration of the Newton-Raphson inverse approximation, which adds at least five multiplications to the six multiplications already required for updating each data point in the time series and those computations have little possible overlap from one data point to the next.

Also using fix-point arithmetic is not advisable because as n increases $1/n$ is getting smaller and eventually the very nature of fix-point arithmetic makes $1/(n+1)$ indistinguishable from $1/n$.

Moreover, the incremental update method updates the cumulative statistic for the whole time series which means that more than one incremental update per data point should be performed to generate statistics on shorter time windows.

Looking again at Equation 11 and keeping in mind the desire to gather the statistics at different time scales, a different way to compute those statistical moments is possible, as shown below. This technique is referred to in the document as the symmetric update technique.

A pairwise update equation can be used with both sequence length equal to a power of two e.g., $2^b$. This results in the following moment equation:

$$M_X^p = \qquad (13)$$

$$M_{X1}^p + M_{X2}^p + \sum_{k=1}^{p}\binom{p}{k}\left[\left(\frac{2^b}{2^b+2^b}\right)^k M_{X2}^{p-k} + \left(\frac{-2^b}{2^b+2^b}\right)^k M_{X1}^{p-k}\right]\delta_{2,1}^k$$

In Equation 13:

$$\delta_{2,1} = \mu_{X2} - \mu_{X1}$$

$$\mu_X = \mu_{X1} + \frac{2^b}{2^b + 2^b}(\mu_{X2} - \mu_{X1})$$

$$= \mu_{X1} + \frac{1}{2}\delta_{2,1}$$

After further simplification:

$$M_X^p = M_{X1}^p + M_{X2}^p + \sum_{k=1}^{p}\binom{p}{k}(2^{-k})[M_{X2}^{p-k} + (-1)^k M_{X1}^{p-k}]\delta_{2,1}^k \quad (14)$$

For p even:

$$M_X^p = M_{X1}^p + M_{X2}^p + (2^{b+1-p})\delta_{2,1}^p + \sum_{k=1}^{p-2}\binom{p}{k}(2^{-k})[M_{X2}^{p-k} + (-1)^k M_{X1}^{p-k}]\delta_{2,1}^k \quad (15)$$

For p odd:

$$M_X^p = M_{X1}^p + M_{X2}^p + \sum_{k=1}^{p-2}\binom{p}{k}(2^{-k})[M_{X2}^{p-k} + (-1)^k M_{X1}^{p-k}]\delta_{2,1}^k \quad (16)$$

When the above equations are computed with either binary floating point or fix-point two complement integer arithmetic, the $2a$ terms become respectively an addition to the exponent part of the floating point representation or a mere binary shift. Moreover, as $$\binom{p}{k}$$

are integer constant for a given moment, the final equations do not contain any division; and the last $\Sigma( )$ does not depend on $n=2^b$ which simplifies the computations substantially.

Moreover, for odd moments ($p=2q+1$), the highest power of $\delta_{2,1}$ is $p-2 \rightarrow \delta_{2,1}^{2q-1}$ and the length of the halves ($2^b$) does not appear explicitly.

Before going further, now that the count $M_x^0=n$ is equal to a power of two, $2^b$, let's differentiate the two sequences in the pairwise update as follows: $M_{b_i}^{p\triangleright} \leftrightarrow {}^{\triangleleft}M_{b_i}^p$ and in the same way $\mu_{b_i}^{\triangleright} \leftrightarrow {}^{\triangleleft}\mu_{b_i}$.

This provides, for first five statistical $M_{b_i}^1$ moments with replaced by the raw moment $\mu_{b_i}$, Equations 17-21 below:

$$M_{b_i+1}^0 = M_{b_i}^{0\triangleright} + {}^{\triangleleft}M_{b_i}^0 = 2^b + 2^b \quad (17)$$

$$\mu_{b_i+1} = {}^{\triangleleft}\mu_{b_i} + \frac{1}{2}((\mu_{b_i}^{\triangleright} - {}^{\triangleleft}\mu_{b_i}))^{\triangleleft}\mu_{b_i} + \frac{1}{2}\delta_{\triangleright\triangleleft} \quad \triangleright 3 \triangleleft \quad (18)$$

-continued $$M_{b_i+1}^2 = M_{b_i}^{2\triangleright} + {}^{\triangleleft}M_{b_i}^2 + (2^{b_i-1})\delta_{\triangleright\triangleleft}^2 \quad \triangleright 4 \triangleleft \quad (19)$$

$$M_{b_i+1}^3 = M_{b_i}^{3\triangleright} + {}^{\triangleleft}M_{b_i}^3 + \frac{3}{2}[M_{b_i}^{2\triangleright} - {}^{\triangleleft}M_{b_i}^2]\delta_{\triangleright\triangleleft} \quad (20)$$

$$M_{b_i+1}^4 M_{b_i}^{4\triangleright} + {}^{\triangleleft}M_{b_i}^4 + (2^{b_i-3})\delta_{\triangleright\triangleleft}^4 + \quad (21)$$
$$\frac{3}{2}[M_{b_i}^{2\triangleright} + {}^{\triangleleft}M_{b_i}^2]\delta_{\triangleright\triangleleft}^2 + 2[M_{b_i}^{3\triangleright} - {}^{\triangleleft}M_{b_i}^4]\delta_{\triangleright\triangleleft}$$

Developing these equations for the first four powers of two provides Equations 22-25 below:

$$b = 0 \mapsto M_{b_0}^0 = 1, \mu_{b_0} = x, M_{b_0}^2 = 0, M_{b_0}^3 = 0, M_{b_0}^4 = 0 \quad (22)$$

$$b = 1 \mapsto M_{b_1}^0 = 2, \delta_{\triangleright\triangleleft} = (\mu_{b_0}^{\triangleright} - {}^{\triangleleft}\mu_{b_0}), \mu_{b_1} = {}^{\triangleleft}\mu_{b_0} + \frac{1}{2}\delta_{\triangleright\triangleleft}, \quad (23)$$
$$M_{b_1}^2 = \frac{1}{2}\delta_{\triangleright\triangleleft}^2, M_{b_1}^3 = 0, M_{b_1}^4 = 2^3\delta_{\triangleright\triangleleft}^4 = \frac{1}{2}\left(\frac{1}{2}\delta_{\triangleright\triangleleft}^2\right)^2$$

$$b = 2 \mapsto M_{b_2}^0 = 4, \delta_{\triangleright\triangleleft} = (\mu_{b_1}^{\triangleright} - {}^{\triangleleft}\mu_{b_1}), \mu_{b_2} = {}^{\triangleleft}\mu_{b_1} + \frac{1}{2}\delta_{\triangleright\triangleleft}, \quad (24)$$
$$M_{b_2}^2 = M_{b_1}^{2\triangleright} + {}^{\triangleleft}M_{b_1}^2 + \delta_{\triangleright\triangleleft}^2 \mapsto M_{b_2}^3 + \frac{3}{2}[M_{b_1}^{2\triangleright} - {}^{\triangleleft}M_{b_1}^2]\delta_{\triangleright\triangleleft},$$
$$M_{b_2}^4 = M_{b_1}^{4\triangleright} + {}^{\triangleleft}M_{b_1}^4 + 2^{-2}\delta_{\triangleright\triangleleft}^4 + \frac{3}{2}[M_{b_1}^{2\triangleright} - {}^{\triangleleft}M_{b_1}^2]\delta_{\triangleright\triangleleft}^2$$

$$b = 3 \mapsto M_{b_3}^0 = 8, \delta_{\triangleright\triangleleft} = (\mu_{b_2}^{\triangleright} - {}^{\triangleleft}\mu_{b_2}), \quad (25)$$
$$\mu_{b_3} = {}^{\triangleleft}\mu_{b_2} + \frac{1}{2}\delta_{\triangleright\triangleleft}, M_{b_3}^2 = M_{b_2}^{2\triangleright} + {}^{\triangleleft}M_{b_2}^2 + 2\delta_{\triangleright\triangleleft}^2 \mapsto M_{b_3}^3 =$$
$$M_{b_2}^{3\triangleright} + {}^{\triangleleft}M_{b_2}^3 + \frac{3}{2}[M_{b_2}^{2\triangleright} - {}^{\triangleleft}M_{b_2}^2]\delta_{\triangleright\triangleleft} \mapsto M_{b_3}^4 = M_{b_2}^{4\triangleright} + {}^{\triangleleft}M_{b_2}^4 +$$
$$\frac{3}{2}[M_{b_2}^{2\triangleright} + {}^{\triangleleft}M_{b_2}^2]\delta_{\triangleright\triangleleft}^2 + 2[M_{b_2}^{3\triangleright} - {}^{\triangleleft}M_{b_2}^3]\delta_{\triangleright\triangleleft} + \frac{1}{2}\delta_{\triangleright\triangleleft}^4$$

In these equations, the parameter "b" is the stage number. Referring back to FIG. 1A, the symmetric update computation component 103 includes N stages 105-1-105-N that each include multiple, e.g., M, compute units 106-1-106-M. Each compute unit can also be referred to as a layer, and each layer can compute a statistical moment of a particular order p. As described in more detail below with reference to FIGS. 2 and 3, the compute units of each stage can be arranged in a sequence, e.g., in a cascade arrangement, such that later compute units receive the output of earliest compute units for use in computing statistical moments. Each stage 105 computes the statistical moments for a time series of data points with a number of data points equal to 2, where "i" is the stage number of the stage. For example, the first stage (i=1) computes the statistical moments for the most recent two data points, the second stage (i=2) computes the statistical moments for the most recent four data points, the third stage (i=3) computes the statistical moments for the most recent eight data points, and so on. The number of stages can be selected for the symmetric update computation component 103 based on the maximum data points for which statistical moments are to be computed for the IoT device 101. For example, if the maximum number of data points is 1000, the symmetric update computation component 103 can include 10 stages as $2^{10}=1024$. The number of data points depends on the number of data points received per unit time (e.g., per second) and the time periods for which statistical moments are to be computed.

Each compute unit 106 computes a respective statistical moment for its time series of data points. For example, the compute unit 106-1 computes the first order statistical moment, the compute unit 106-2 computes the second order statistical moment, and the Mth compute unit 106-M computes the Mth order statistical moment.

The compute units 106 can use Equations 13-25 to compute the statistical moments. For example, the compute units 106 can use Equations 17-21 for the first five statistical moments. That is, the compute unit 106-1 can use Equation 17 for the first statistical moment; the compute unit 106-2 can use Equation 18 for the second statistical moment, the compute unit 106-3 (not shown) can use Equation 19 for the third statistical moment and so on.

As described in more detail below, the symmetric computation component 103 can use a one bit register $\beta_b$ per stage b=n as well as three registers for $\mu$, $M^2$, $M^3$. When a stage b has its bit register $\beta_b=0$, the stage can just store the values for $\mu$, $M^2$, $M^3$ sent by the stage b−1 and flip $\beta_b$ to 1. When a stage b has its bit register $\beta_b=1$, the stage can compute $\mu_{b+1}$, $M_{b+1}^2$, $M_{b+1}^3$ from the values in its registers and the value received from the stage below b−1. The values of $\mu_{b+1}$, $M_{b+1}^2$, $M_{b+1}^3$ are then passed to the layer above (b+1) and $\beta_b$ is reset to zero. Operating in this way, a stage b, alternates storing data or computing update every $2^{b-1}$ data points. At any given time, the reading the br register across all stages gives the overall count of every data point received.

The computation cost for the symmetric computation component 103 is as follows:

$2^1$: 1 add, 1 sub, 1 mult ∿ 1 add+1 sub+1 mult $2^2$: 4 adds, 2 subs, 2 mults ∿ 6 ads+4 subs+4 mults $2^3$: 6 adds, 2 subs, 2 mults ∿ 18 adds+10 subs+10 mults $2^4$: 6 adds, 2 subs, 2 mults ∿ 42 adds+22 subs+22 mults

. . .

$2^b$: 6 adds, 2 subs, 2 mults ∿ $3 \times 2^b - 6$ adds+$3 \times 2^{b-1} - 2$ subs+$3 \times 2^{b-1} - 2$ mults vs incremental update:

$2^b$: 8 adds, 5 subs, 11 mults ∿ $8 \times 2^b$ adds+$10 \times 2^{b-1}$ subs+$22 \times 2^{b-1}$ mults The symmetric power of two update method compared against the incremental update method results in:

$$\text{Additions: } \frac{8 \times 2^b}{3 \times 2^b} \approx \frac{8}{3} \approx 2.66 \times \text{less additions.}$$

$$\text{Subtractions: } \frac{10 \times 2(b-1)}{3 \times 2^b - 2} \approx \frac{10}{3} \approx 3.33 \times \text{less subtractions.}$$

$$\text{Multiplications: } \frac{22 \times 2^{b-1}}{3 \times 2^b - 2} \approx \frac{16}{3} \approx 7.33 \times \text{less multiplications}$$

Fewer operations for the symmetric computation component 103 means fewer operations ran for the same $2^n$ count of data points. However, in a hardware implementation, the system can include up to b stages with each having eight adders (two operating in subtraction mode) and two multipliers for all stages b>1. The first stage, b=0, can have two adders+one multiplier, and the b=1 stage can have six adders and two multipliers. Depending on the speed of the process stage, above a threshold bt are simulated by a set of registers for br, $\mu$, $M^2$, $M^3$ in the above example. Therefore, if the maximum number of stages is 40, the last 40−(bt+1) stages can be virtual and executed in succession by the stage bt following the same technique.

A system that includes one or more hardware and/or software computation components can be used to compute the statistical moment equations provided above. Each computation component can include a symmetric update computation component 103 that uses the symmetric update technique to update the statistical moments for a time series in response to receiving a new data point of a time series. Each symmetric update computation component 103 can include adders and multipliers for the various stages. A symmetric update computation component 103 can also include, for each stage, registers (or other memory components) for storing values received from other stages and values computed by the stage. Each implementation of such a symmetric update computation component 103 can be defined by the number of stages and the supported statistical moments. Each symmetric update computation component 103 can also be extended with one or more slot(s) FIFO per statistics at each layer.

Each new value received by a given stage from a previous stage can be pushed into the FIFO(s) for the given stage. This ensures that the most recent statistics for a set of increasing intervals is available for immediate analysis by the given stage.

When working with time series, the IoT device 101 or other device or system can include a symmetric update computation component 103 dedicated to each time series. Each symmetric update computation component 103 can also compute and store, e.g., in registers, the minimum, the maximum, the value of the first data in its time series and the value of the last value in its time series so that those values are available at any time scale.

To illustrate how the symmetric computation components 103 operate, consider an example in which the IoT device 101 includes a symmetric update computation component 103 for each of one or more time series of data values. Upon receiving a new time series data point, the IoT device 101 can broadcast the data point to both a long term storage, e.g., a time series database, and a symmetric update engine 107 of the symmetric update computation component 103 associated with the time series. The symmetric update computation component 107 can include a respective symmetric update engine 107 for each time series. The symmetric update engine 107 for a time series of data points offers at all times the data points count as well as intermediary values for the statistics gathered by the symmetric update engine 107.

For example, computing the statistical moments over rolling windows of length $2^w$ with an offset of length $2^w/4$ simply require to extract the moments value at layer $\lambda=w-2$, $\lambda+1$ and $\lambda+2=w$. Indeed, the rolling windows overlap by length multiple of $2^\lambda$. Defining $\tau = 2 \times \beta_{\lambda+1} + \beta_\lambda$, the four overlapping windows start when $\tau=0, 1, 2, 3$ respectively. Therefore:

$$\tau = 0 M_{W_0}^p := M_\omega^p \tag{26}$$

$$\tau = 1 M_{W_1}^p := \sum_{t=1}^{4} M_{\lambda,\tau=tmod4}^p \text{ the sum start when } \tau = 1 \tag{27}$$

$$\tau = 2 M_{W_2}^p := M_{\lambda+1,\tau=2}^p + M_{\lambda+1,\tau=0}^p \text{ the sum start when } \tau = 2 \tag{28}$$

$$\tau = 3 M_{W_3}^p := \sum_{t=3}^{6} M_{\lambda,\tau=tmod4}^p \text{ the sum start when } \tau = 3 \tag{29}$$

In the above definition, $\Sigma$ and + refer to a symmetric update. The cost is equivalent to adding two two-layer symmetric update computation components and one one-layer symmetric update computation component running at $2^{-w}$ the rate of the symmetric update computation component from which it gets its value. In other words, every $2^t$ data points injected into a computation component, 10×{6 adds, 2 subs, 2 mults} additional (to be contrasted with the incremental update that require per window: $2^w \times \{4$ adds, 2 subs, 5 mults$\})$ operations will be performed.

Another aspect of the symmetric update computation components 103 with symmetric update engines 107 is the possibility to send, to another symmetric update computation component 103 on another device, the output of any stage enabling the other devices to either continue or duplicate the statistical computation.

For example, an IoT or IoIT device can monitor an electric power line feeding an inductive load. The power line can have three phases AC at 60 Hz with no neutral. Six sensors can measure voltage and current for each phase at a 128 Hz (the capture will stay above the Nyquist minimum capture frequency for fluctuation in frequency up to 63.5 Hz) and alongside the time series associated with the sensors a time series capture the delta of time in microseconds between measurements.

For this example implementation, the number of stages the computation component should include can be determined. At 128 Hz, the first seven stages will compute the statistics for sub-second sized windows. If the intent is to keep one year of data on the device [$\log_2(365.5 \times 24 \times 3600)$] =25 additional stages will be needed for a total of 32 stages. Past the first 10 stages, ~16 sec, the remaining 22 stages can be folded in one with 22 memory slots for each stage but one stage worth of computation resources.

The memory size per stage that maintains or computes first, last, min, max, mean, second, third and fourth moments from four byte sensor data points and the centered moments computed over eight bytes will be: $2 \times (5 \times 4 + 3 \times 8) = 88$ bytes. Therefore, one year's worth of statistics, a 32-stages computation component will require less than 3 KB of data storage. Also, if the output of stage ten is sent out to a remote device/server, less than 64 bytes (44 bytes of stats plus time series UID and time stamp) every 16 seconds and less than half a KB for the seven stage computation component. This small data requirement enables the use of communications networks offering only few Kbits/s of bandwidth.

Figure 7:
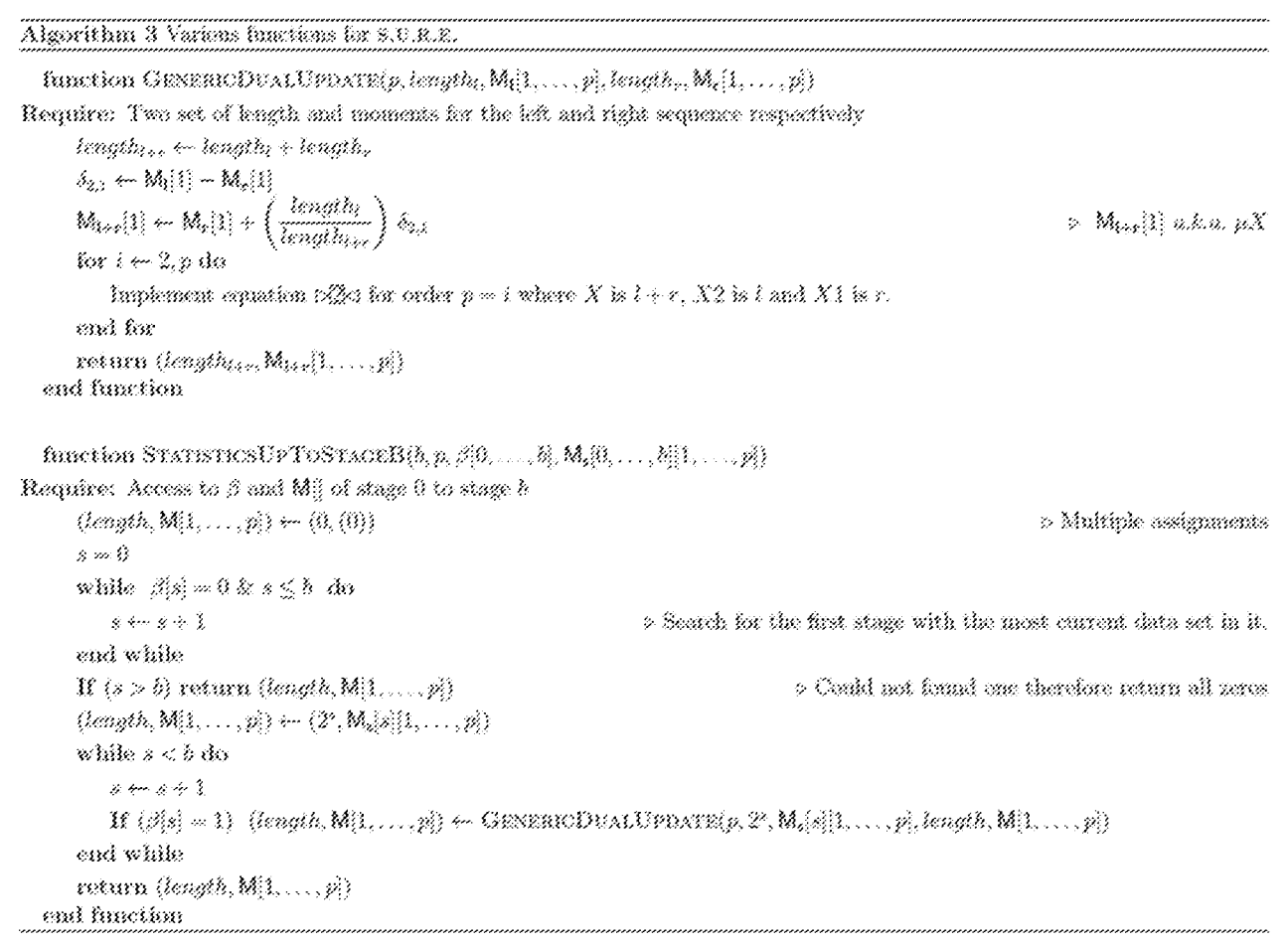

FIGS. 5-7 show pseudocode that represents the operations that can be performed by the stages of the symmetric update computation component 103 to compute statistical moments for a time series of data points. In particular, FIG. 5 shows pseudocode 500 for the first stage 105-1 (stage zero). In this example, each time a new data point x is injected for a time series, the associated computation component is activated by calling STAGELAYERZERO( ) with the new data point x. FIG. 6 shows pseudocode 600 that represents operations performed by each other stage 105-2-105-N of the symmetric update computation component 103. FIG. 7 shows pseudocode of other functions that can be performed by the symmetric update computation component 103.

Figure 1B:
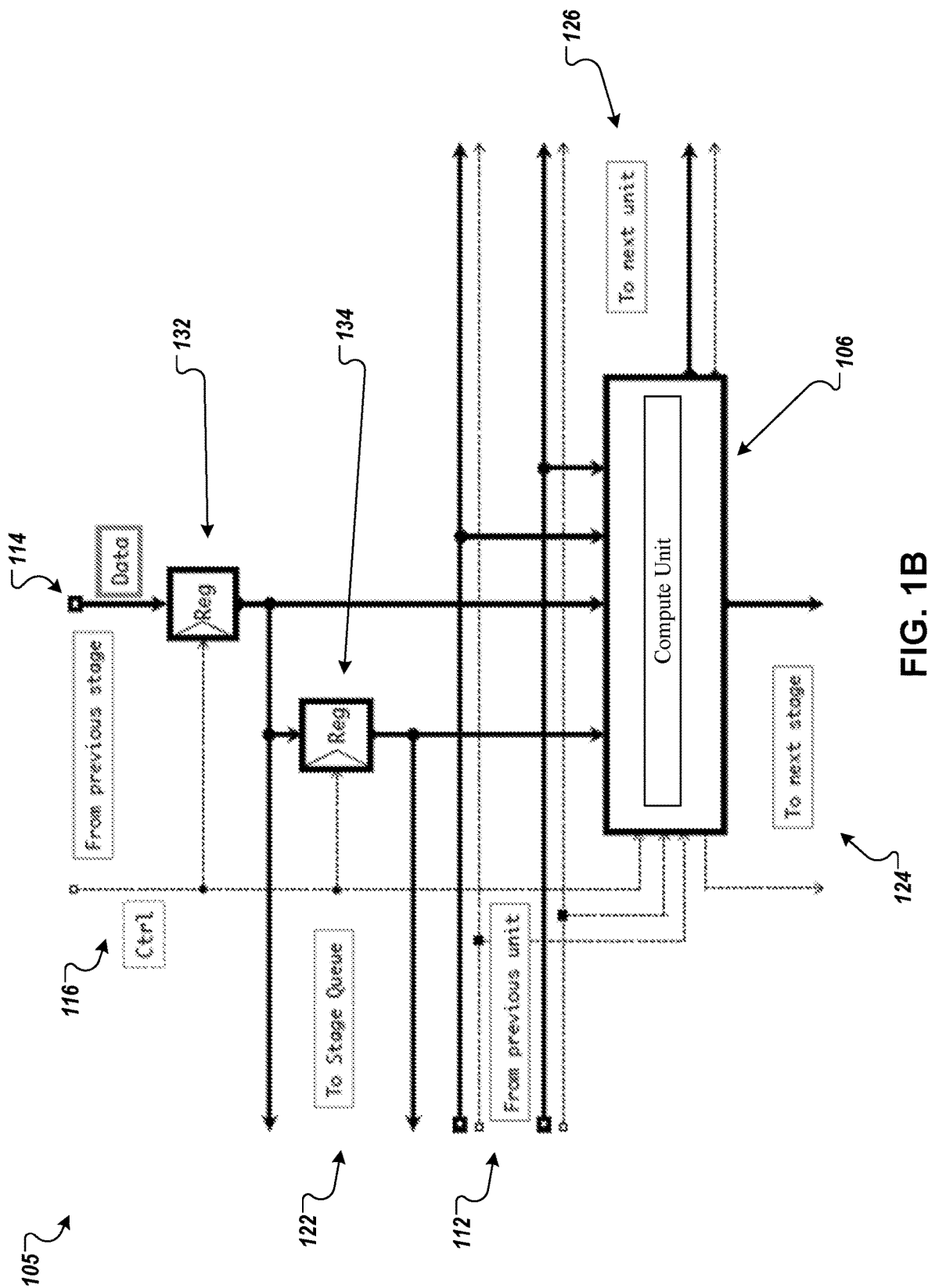
FIG. 1B is a block diagram of a portion of the computation component of FIG. 1A.

FIG. 1B is a block diagram of a portion of the symmetric update computation component 103 of FIG. 1A. In particular, FIG. 1B shows a portion of one stage 105 of the symmetric update computation component 103 that includes one compute unit 106 of the multiple compute units of the stage 105. The compute unit 106 is connected to registers 132 and 134. The registers 132 and 134 store data values 114 received from a previous stage (if any) or from a data source. For example, if the compute unit 106 is the first compute unit 106-1 of the first stage 105-1, the register 132 can receive data from a data source. Otherwise, the register 132 would receive data from a previous stage.

The compute unit 106-1 can compute its statistical moment using the data values stored in the registers 132 and 134 and/or data values 112 received from a previous compute unit, e.g., for second and higher order moments. The data values stored in the registers 132 and 134 can also be provided as output data 122 to a stage queue. The compute unit 106 can output its computed statistical moment as a data value 126 to the next compute unit (if any) and as a data value 124 for the next stage (if any).

The compute unit 110 and the registers 132 and 134 can also receive a control signal 116 from a previous stage. This control signal 116 can be a bit that is used to determine whether to store values from the previous stage or to make a computation. For example, the control signal can be the bit $\beta^{-1}$ received from a register of the previous stage, as described below with reference to FIG. 4. When the control signal 116 has a first value (e.g., one), the compute unit 110 can compute its statistical moment. When the control signal 116 has a second value (e.g., zero), the registers 132 and 134 can update their values. For example, the register 132 can update its value to a value received from a previous stage (or data source) and the register 134 can update its value to the value stored by the register 132 prior to the update. In this way, the registers 132 and 134 store the most recent two values received from the previous stage or data source and the compute unit 106 can compute its statistical moment using the two values and values from a previous compute unit (if any).

Figure 2:
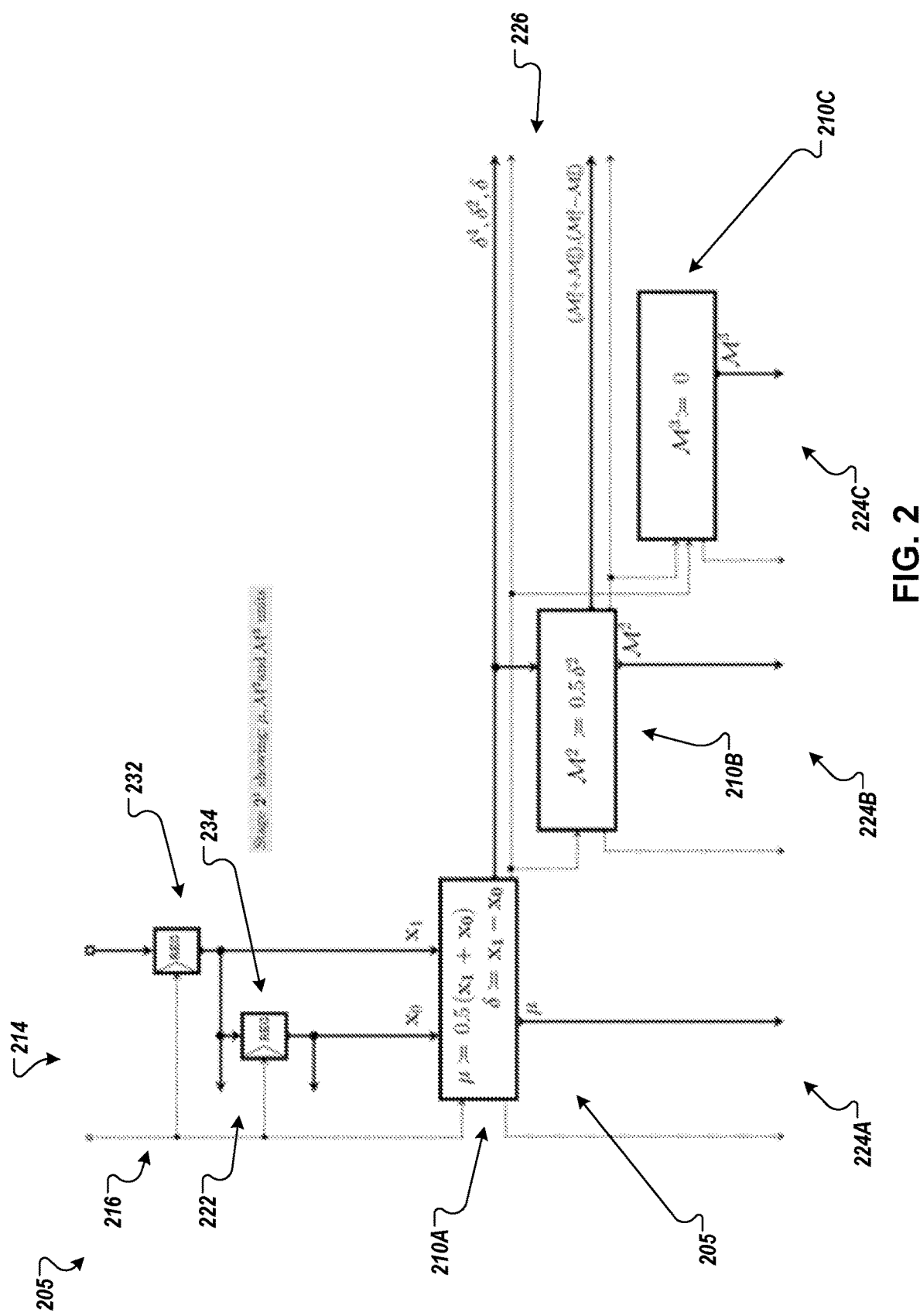
FIG. 2 is block diagram of an example stage of a computation component.

FIG. 2 is block diagram of an example stage 205 of a computation component, e.g., of the symmetric update computation component 1-3 of FIG. 1A. In this example, the stage 205 includes three compute units 210A-210C that compute first, second, and third order statistical moments for a time series of data points, e.g., received by an IoT or IoIT device. However, the computation component can include more compute units for computing higher order statistical moments or fewer compute units if higher order statistical moments are not required.

The compute units 210A-210C are arranged in a sequence such that each subsequent compute unit receives computed values from its previous compute unit. That is, the compute unit 210B receives the computed statistical moment(s) from the compute unit 210A and the compute unit 210C receives the computed statistical moment(s) from the compute unit 210B.

In this example, the stage 205 is a first stage for the computation component. In the first stage, the computation component computes statistical moments based on two data points $x_0$ and $x_1$. These two data points can be the two most recent data points of the time series received by the computation component. As the first stage does not receive values from other stages, the first stage 205 can include registers 232 and 234 for storing the values of the two data points. The values of the registers 232 and 234 can also be provided as output data 222 to a stage queue.

The compute unit 210A can determine the mean ($\mu$) of the two data points $x_0$ and $x_1$ and the difference ($\delta$) between the two data points $x_0$ and $x_1$. The compute unit 210A can output the difference and/or derivations of the difference, e.g., the square of the difference, to the compute unit 210B. The compute unit 210A can also output the mean to the next stage as output data 224A.

The compute unit 210B can compute a second order statistical moment, e.g., the variance between the two data points based on the difference received from the compute unit 210A. For the first stage 205, the compute unit 210B can compute the second order statistical moment as one half of the square of the difference between the two data points. For subsequent stages, the second order statistical moment can be computed using one of the statistical moment equations provided above, e.g., Equation 18. The compute unit 210B can output the second order statistical moment to the next stage as output data 224B.

The compute unit 210C can compute a third order statistical moment for the two data points. In the first stage 205, this third order statistical moment may always be zero. The compute unit 210C can output the third order statistical moment to the next stage as output data 224C. The output data 224A-224C can be stored in registers of the next stage and used by the next stage to compute statistical moments for more data points in the time series. The compute units 205 of the stage 205 can also output data 226 that includes the statistical moments and values computed based on the statistical moments, e.g., to a storage device or display of the IoT device.

The compute unit 210A and the registers 232 and 234 can also receive a control signal 216. In the first stage, the control signal 216 can be toggled between a value of zero and a value of one each time a new data point in the time series is received. This control signal 216 can be a bit that is used to determine whether to store values or to make a computation. The compute unit 210A can include a register similar to the register 400 of FIG. 4 that determines the value β for this stage 205. The compute unit 210A can provide the value β to each other compute unit 210B and 210C of the stage and each compute unit 210A-210C can use the value β to determine whether to compute their respective statistical moments.

When the value β is equal to a first value (e.g., one), the compute units 210A-210C can compute their statistical moment. When the value β is equal to a second value (e.g., zero), the registers 232 and 234 can update their values. For example, the register 232 can update its value to a value received from a previous stage and the register 234 can update its value to the value stored by the register 232 prior to the update.

Figure 3:
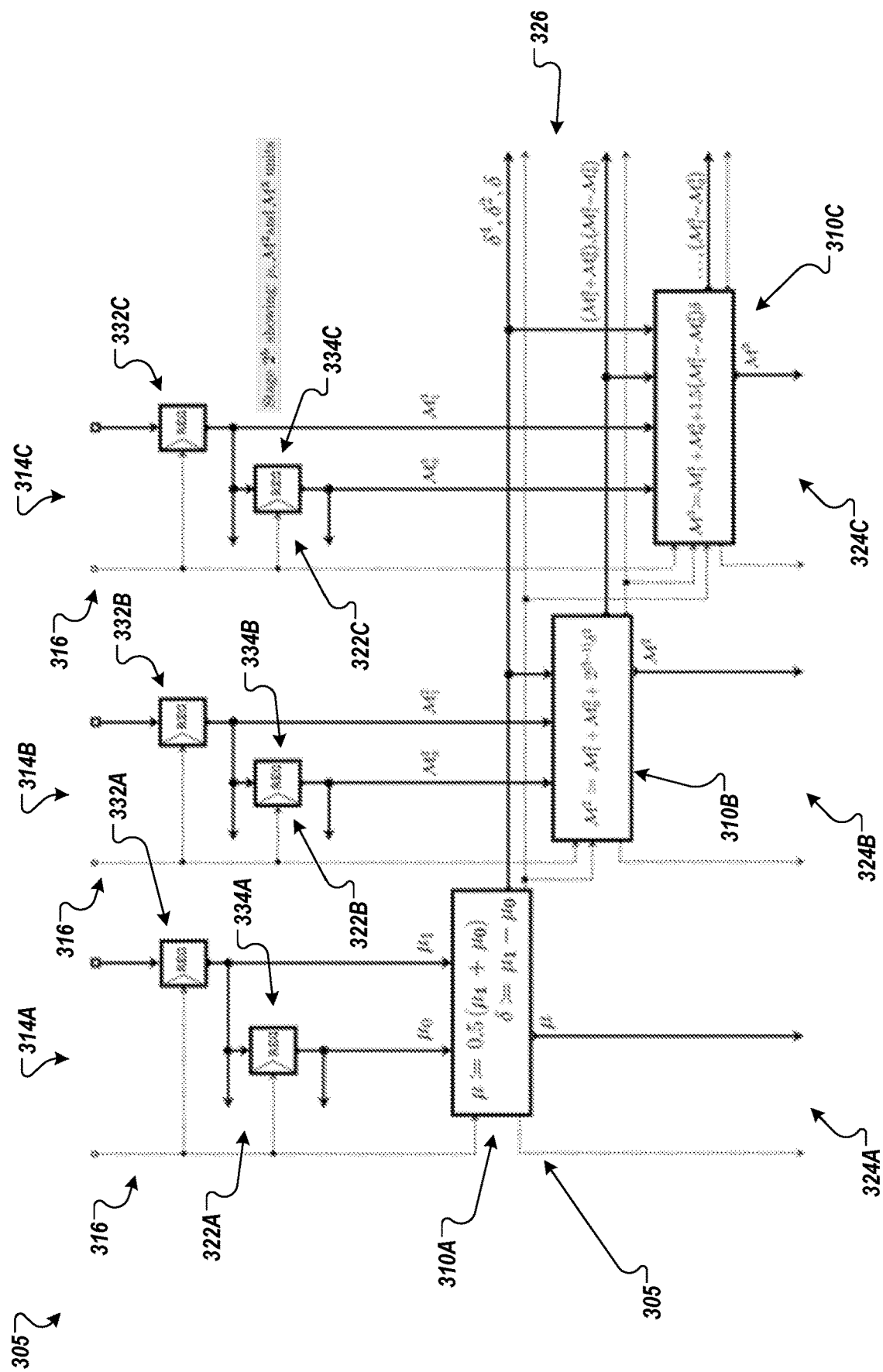
FIG. 3 is a block diagram of an example stage of a computation component.

FIG. 3 is a block diagram of an example stage 305 of a computation component. The stage 305 can represent stages other than the first stage 205 illustrated in FIG. 2. That is, the stage 305 can be the second stage, third stage, and so on.

The stage 305 also includes the same number of compute units (i.e., 3) as the first stage 205. The compute units 310A-310C are arranged in a sequence such that each subsequent compute unit receives computed values from its previous compute unit. That is, the compute unit 310B receives the computed statistical moment(s) from the compute unit 310A and the compute unit 310C receives the computed statistical moment(s) from the compute unit 310B.

The stage 305 includes a pair of registers for each compute unit. For example, the stage 305 includes registers 332A and 334A for storing data values for the compute unit 310A, registers 332B and 334B for storing data values for the compute unit 310B, and registers 332C and 334C for storing data values for the compute unit 310C.

The register 334A can store the first order statistical moment (e.g., mean) received from the compute unit of the previous layer (e.g., layer 205 if the layer 305 is the second layer) that computes the first order statistical moment. The register 332A can store the previous first order statistical moment received from the previous layer. The compute unit 310A can use the two values stored in the registers to compute the mean of the two data values stored in the registers 332A and 332B and the difference between the two values. The compute unit 310A can output the difference and/or derivations of the difference, e.g., the square of the difference, to the compute unit 310B. The compute unit 310A can also output the mean to the next stage as output data 324A.

In the second stage, the registers 332A and 332B both store the mean of two data points in the time series. Thus, the mean computed by the compute unit 310A is the mean of four data points in the second stage. In the third stage, the compute unit 310A would compute the mean of two data points that each represent the mean of four data points, thus computing the mean of eight data points. Thus, the number of data points in each stage increases exponentially and the computation system can include a number of stages based on the number of data points for which statistical moments are to be computed.

The compute unit 310B can compute the second order statistical moment (e.g., variance) based on the data values stored in the registers 332B and 334B and the statistical moment(s) output by the compute unit 310A. For example, the compute unit 310B can use Equation 18 to compute the second order statistical moment, as shown in FIG. 3. The register 334B stores the most recently computed second order statistical moment received from the previous stage. Similarly, the register 332B stores the second order statistical moment received from the previous stage prior to the most recent statistical moment.

Similar to the number of data points for the compute unit 310A, the number of data points represented by the values in the registers in each stage increases exponentially. In the second stage, the registers 332B and 334B would both store the second order statistical moment of two data points such that the compute unit 310B would compute the second order statistical moment represented by the four data points. In the third stage, the compute unit 310B would compute the second order statistical moment of a total of eight data points as each register 332B and 334B would store values representing the second order statistical moment of four data points.

The compute unit 310B can output its computed second order statistical moment to the next stage as output data 324B. The compute unit 310B can also output the second order statistical moment to the compute unit 310C.

The compute unit 310C can compute the third order statistical moment based on the data values stored in the registers 332C and 334C. For example, the compute unit 310C can use the third order statistical moment equation provided above, e.g., Equation 19, to compute the third order statistical moment, as shown in FIG. 3. The register 334C stores the most recently computed third order statistical moment received from the previous stage. Similarly, the register 332C stores the second order statistical moment received from the previous stage prior to the most recent statistical moment.

Similar to the number of data points for the compute unit 310A, the number of data points represented by the values in the registers in each stage increases exponentially. In the second stage, the registers 332C and 334C would both store the third order statistical moment of two data points such that the compute unit 310C would compute the third order statistical moment represented by the four data points. In the third stage, the compute unit 310C would compute the third order statistical moment of a total of eight data points as each register 332C and 334C would store values representing the third order statistical moment of four data points.

Using the multiple stages and sequences of compute units in each stage, the symmetric update computation component can compute multiple orders of statistical moments for multiple different portions of data points without having to store the individual values of the data points. For example, the third stage computes its statistical moments based on statistical moments of a previous stage and values output by previous compute units within the third stage, without having access to the individual data values received by the IoT device.

The compute unit 310C can output its computed third order statistical moment to the next stage as output data 324C. The compute unit 310C can also output the third order statistical moment to the compute unit 310C.

The stage 305 can output, as output data 326, the computed difference between the means (as computed by the compute unit 310A), the sum and/or difference between the computed second order statistical moment and the previously computed second order statistical moment, and the difference between the computed third order statistical moment and the previously computed third order statistical moment, e.g., to a storage device or display. The values stored by the register 332A-332B and 334A-334C can be provided to the stage queue.

The compute units 310A-310C and the registers 332A-332C and 334A-334C can also receive a control signal 316. In stages other than the first stage, the control signal 316 can be the value 1-1 received from the previous stage. This control signal 316 can be a bit that is used to determine whether to store values or to make a computation. Each compute unit 310A-310C can include a register similar to the register 400 of FIG. 4 that determines the value β for this stage 305.

When the value β is equal to a first value (e.g., one), the compute units 310A-310C can compute their statistical moment. When the value β is equal to a second value (e.g., zero), the registers 332A-332C and 334A-334C can update their values. For example, the register 332A can update its value to a value received from a previous stage and the register 334A can update its value to the value stored by the register 332A prior to the update.

Figure 4:
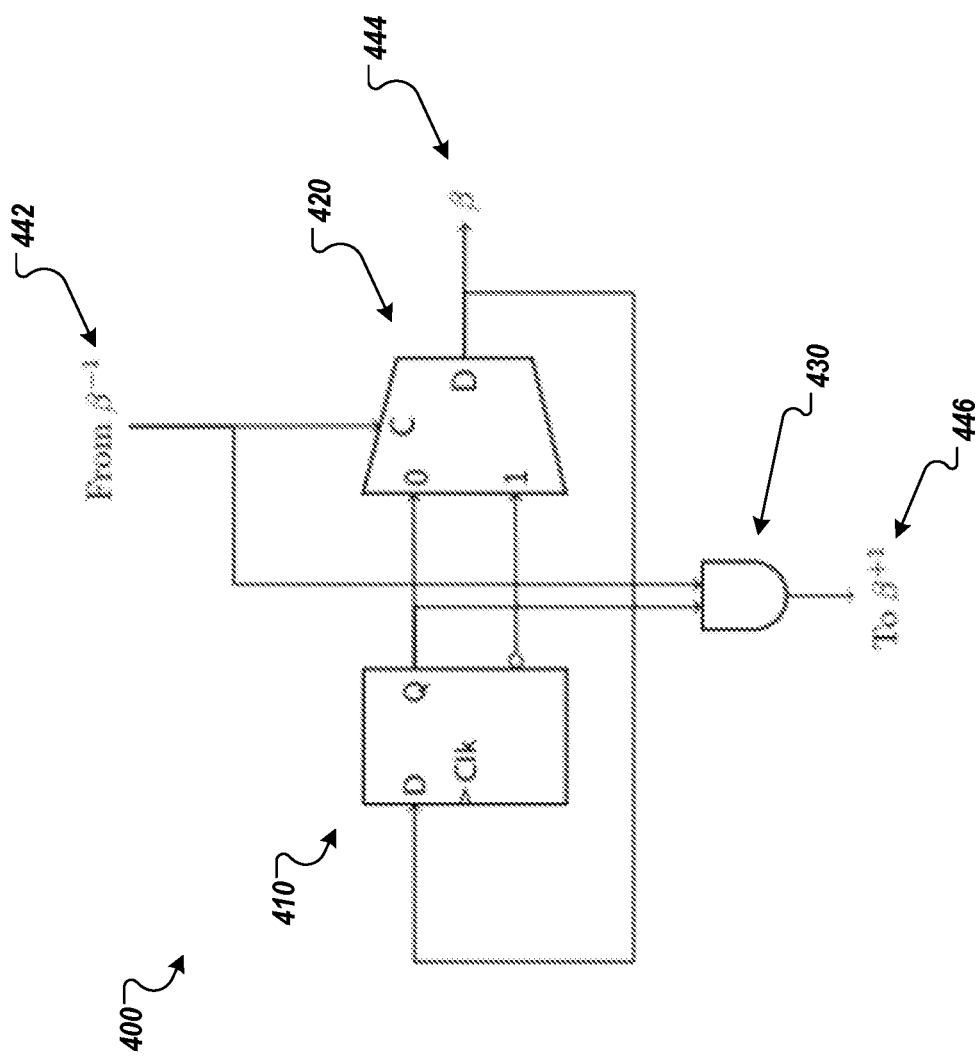
FIG. 4 is block diagram of an example register.

FIG. 4 is block diagram of an example register 400. The register 400 is an example hardware implementation of the one-bit registers β described above. The register 400 includes a D-FlipFlop 410, a multiplexer 420, and an AND gate 430. As described above, each layer can include a one-bit register β for determining whether to store values from a previous layer or to compute statistical moments using the values from the previous layer. For example, when the value 444 stored by the register β is equal to zero, the layer can store the values from the previous layer. When the value 444 stored by the register β is equal to one, the compute units of the layer can compute their statistical moments and provide the computed statistical moments to the next layer.

The output 444 is based on the value 442 stored by the register $\beta^{-1}$ for the previous layer and the current value of the register β. Similarly, the value of the next layer $\beta^{+1}$ is based on the value 444 of the register β and the value of the register $\beta^{-1}$, e.g., based on the output 446 of the AND gate 430. Each layer can include a similar register β that receives the value of the register $\beta^{-1}$ of the previous layer, computes its value 444, and provides a value 446 to the next layer. The values of the registers can be incremented each time a new data value is received for the time series for which statistical moments are being computed.

Figure 8:
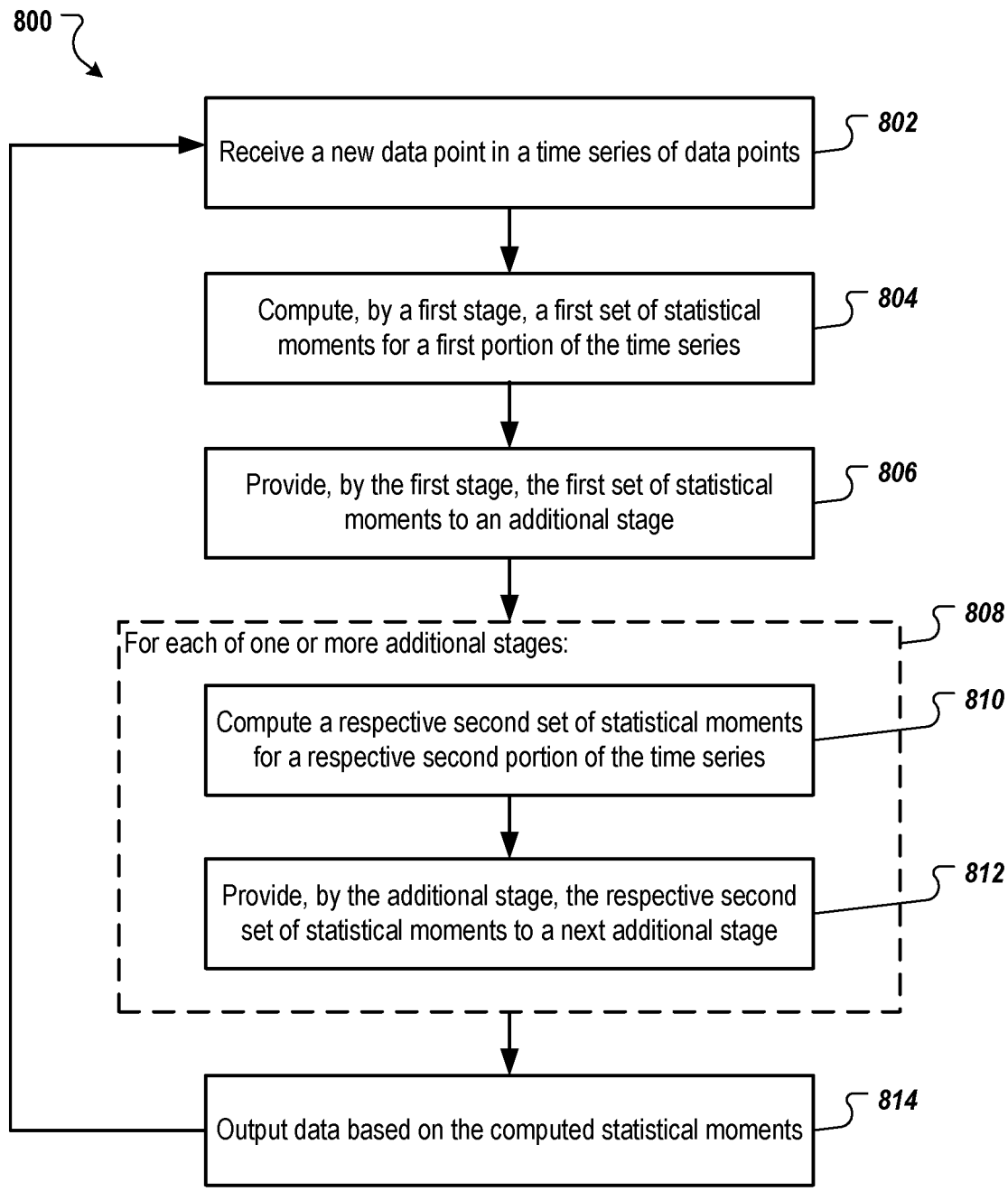
FIG. 8 is a flow diagram that illustrates an example process for computing statistical moments.

FIG. 8 is a flow diagram that illustrates an example process 800 for computing statistical moments. The process 800 can be implemented by, for example, the IoT device 101 of FIG. 1A. For example, operations of the process 900 can be performed by the symmetric update computation component 103 of the IoT device 101 with the stages shown in FIGS. 1B-3.

The symmetric update computation component 103 receives a new data point in a time series of data points (802). For example, the symmetric update computation component 103 can periodically receive a new data point from a data source.

A first stage of the symmetric update computation component 103 computes a first set of statistical moments based on the new data point (804). As described above, each stage can include multiple compute units that each compute a respective order of statistical moment. The first stage can compute multiple statistical moments based on the new data point and a previous data point. For example, a first compute unit can compute a first order statistical moment based on the two data points, a second compute unit can compute a second order statistical moment based on the two data points and the output of the first compute unit, and so on.

The first stage can provide the first set of statistical moments to an additional stage (806). For example, the first stage can provide the first set of statistical moments to the next stage of the symmetric update computation component 103, e.g., to the second stage.

Each additional stage of the symmetric update computation component 103 can compute respective second set of statistical moments based on respective second portions of the data points in the time series of data points (808). Each additional stage can compute its respective second of statistical moments using constituent operations 810 and 812.

The additional stage computes its respective second set of statistical moments (810). For example, the second stage can compute statistical moments based on the statistical moments output by the first stage. For example, a first compute unit of the second stage can compute a first order statistical moment based on two first order statistical moments output by the first compute unit of the first stage. As each statistical moment output by the first stage is based on two data points, the first order statistical moment computed by the first compute unit of the second stage is based on four data points, e.g., the four most recent data points. Similarly, the second compute unit of the second stage can compute a second order statistical moment based on two second order statistical moments received from the second compute unit of the second stage. As each of these two second order statistical moments are based on two data points, the second order statistical moment computed by the second compute unit of the second stage would be based on four most recent data points. The additional stage can compute the statistical moments using Equations 14-19 to compute the statistical moments, as shown in FIG. 3.

The additional stage provides the respective second set of statistical moments computed by the additional stage to the next additional stage if there is one (812). Each additional stage can compute its respective second set of statistical moments and provide them to the next additional stage. The number of data points for each stage increases exponentially. For example, the statistical moments computed by the third stage are based on eight data points (e.g., two statistical moments output by the second stage that are each based on four data points), the statistical moments computed by the fourth stage are based on 16 data points, and so on.

The symmetric update computation component 814 outputs data based on the computed statistical moments (814). For example, the symmetric update computation component 103 can provide the statistical moments to another device, e.g., a server that stores and/or presents the data, or display the statistical moments at the IoT device 101. The symmetric update computation component 103 can also compute other quantities, such as Variance/Standard-Deviation, Skewness and Kurtosis based on the statistical moments.

In some implementations, the IoT device 101 can evaluate the statistical moments or other quantities and initiate or perform an action based on the statistical moments. For example, if the variance of a time series exceeds a threshold, the IoT device 101 can generate an alert or notification and send the alert or notification to a user. In another example, the IoT device 101 may be an IoIT device that adjusts another device, e.g., a valve, based on one or more statistical moments being out of, or in, a specified range.

Derivation of the Moments from Equation 2

Starting with a sequence S of length |S| and ∪ representing sequence concatenation:

$$S = \bigcup_{SS:=1}^{B} $$

$$|S| = \sum_{SS:=1}^{B} |S_s| \Rightarrow \text{raw first moment of } S: \mu_S = \frac{1}{|S|}\sum_{S:=1}^{B} |S_s|\mu_{S_s}$$

$$M_S^p = \sum_S (x - \mu_S)^p = \quad (30)$$

$$\sum_{S:=1}^{B}\sum_{S_s}(x-\mu_S)^p = \sum_{S:=1}^{B}\sum_{S_s}((x-\mu_{S_s})+(\mu_{S_s}-\mu_S))$$

$$(a+b)^p = \sum_{k:=0}^{p}\binom{p}{k}a^{p-k}b^k \to M_S^p = \quad (31)$$

$$\sum_{s:=1}^{B}\sum_{S_s}\sum_{k:=0}^{p}\binom{p}{k}[(x-\mu_{S_s})^{p-k}(\mu_{S_s}-\mu_S)^k]$$

Commuting the summations:

$$M_S^p = \sum_{s:=1}^{B}\sum_{k:=0}^{p}\binom{p}{k}\left[(\mu_{S_s}-\mu_S)^k\sum_{S_s}(x-\mu_{S_s})^{p-k}\right] \quad (32)$$

$$M_{S_s}^{p-k} = \sum_{S_s}(x-\mu_{S_s})^{p-k} \quad (33)$$

$$M_S^p = \sum_{k:=0}^{p}\binom{p}{k}\sum_{s:=1}^{B}[(\mu_{S_s}-\mu_S)^k M_{S_s}^{p-k}] \quad (34)$$

and when B = 2

$$M_S^p = \sum_{k:=0}^{p}\binom{p}{k}[(\mu_{S_1}-\mu_S)^k M_{S_1}^{p-k}+(\mu_{S_2}-\mu_S)^k M_{S_2}^{p-k}] \quad (35)$$

$$M_S^p = \quad (36)$$

$$\sum_{k:=0}^{p}\binom{p}{k}\left[\left(-\frac{|S_2|}{|S|}(\mu_{S_2}-\mu_{S_1})\right)^k M_{S_1}^{p-k}+\left(\frac{|S_1|}{|S|}(\mu_{S_2}-\mu_{S_1})\right)^k M_{S_2}^{p-k}\right]$$

$$M^p = \sum_{k:=0}^{p}\binom{p}{k}\left[\left(\frac{n_1}{n}\right)^k M_2^{p-k}\delta_{2,1}^k + \left(-\frac{n_2}{n}\right)^k M_1^{p-k}\delta_{2,1}^k\right] \text{ see}: \triangleright 2 \triangleleft \quad (37)$$

When statistics are desired for sequence lengths that are not a power of two, extra computations may be required. In the computation component described in this document, every layer can have a bit register $\beta_b$ that indicates if the value it contains represents the first half ($\beta_b=1$) of the next level or the second half of the next level.

The overall count since the first data point injected in S.U.R.E. is the binary word $M^0_{\triangleright\triangleleft}=\beta_l\beta_{l-1}\ldots\beta_5,\beta_4\beta_3,\beta_2\beta_1,\beta_0$. An arbitrary length sequence up to the latest data-point injected will match [log$_2$(length)] least significant $\beta$ of $M^0_{\triangleright\triangleleft}$.

Therefore, computing that arbitrary sequence can simply require to sequentially scan those [log$_2$(length)] layers and when $\beta_b$ is set add the statistics of that layer using the generic update algorithm.

The number of generic update is equal to the number of $\beta_b$ set minus one.

$$\mu = \mu_1 + \frac{n_2}{n_1+n_2}(\mu_2+\mu_1), \delta_{2,1} = (\mu_2+\mu_1) \quad (38)$$

$$M^p = \sum_{k=0}^{p}\binom{p}{k}\left[\left(\frac{n_1}{n}\right)^k M_2^{p-k}\delta_{2,1}^k + \left(-\frac{n_2}{n}\right)^k M_1^{p-k}\delta_{2,1}^k\right] \quad (39)$$

$$\gamma = \frac{1}{n_1+n_2}\delta_{2,1} \Rightarrow \mu = \mu_1 + n_2\gamma \quad (40)$$

$$M^p = \sum_{k=0}^{p}\binom{p}{k}[n_1^k M_2^{p-k} + (-n_2)^k M_1^{p-k}]\gamma^k \quad (41)$$

However, series of $\beta_b, \ldots, \beta_{b+i}$ that are set can be efficiently computed together by observing that the length of the sequence is of the form $$2^b+2^{b+1}+2^{b+2}+\ldots+2^{b+i}=2^b[1+2+4+\ldots+2^i]=2^b[2^{i+1}-1].$$

By updating a sequence of length $n_2=2^{b+i+1}$ with a sequence of length $n_1=\Sigma_{j\in[0,i]}2^{b+j}$, the terms $$\frac{n_2}{n_1+n_2}$$

and $$\frac{n_1}{n_1+n_2}$$

that appear in the computation of $\mu$ and the $M^p$ can be simplified to $$\frac{2^{b+i+1}}{2^b(2^{i+2}-1)} = \frac{2^{i+1}}{2^{i+2}-1} \text{ and } \frac{2^{i+1}-1}{2^{i+2}-1},$$

respectively. With i less than 50 (a sequence of length $2^{50}$ has more than $10^{15}$ (a million of billion) data points . . . ), those inverse values $$\frac{1}{2^i-1}$$

can be tabulated turning the division into a multiplication.

Although the systems and techniques described above have largely been described in terms of time series data, the systems and techniques can also be used to compute statistical moments for other input data, such as a sequence of data points, a time series, sub sampled (randomly or not) time series, or extracted values from a sequence at a particular interval and/or offset.

Certain novel aspects of the subject matter of this specification are set forth in the claims below.

Embodiments of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. The computer storage medium can be a machine readable storage device, a machine readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system for computing statistical moments for a time series of data points, the system comprising:
a plurality of stages of compute units, including:
a first stage that includes a first sequence of compute units comprising:
a first compute unit configured to compute a first raw statistical moment for a first portion of data points in the time series of data points; and
one or more first additional compute units that are each configured to compute a respective first statistical moment for the first portion of data points, wherein the respective first statistical moment computed by each first additional compute unit is one order higher than the respective first statistical moment computed by a previous compute unit in the first stage; and
one or more additional stages, wherein each additional stage includes a second sequence of compute units for computing statistical moments for a respective second portion of the time series of data points, each additional stage comprising:
a second compute unit configured to compute the first raw statistical moment for the respective second portion of the time series of data points; and
one or more second additional compute units that are each configured to compute a respective second statistical moment for the respective second portion of the data points, wherein the respective second statistical moment computed by each second additional compute unit is one order higher than the respective second statistical moment computed by a previous compute unit in the additional stage,
wherein a number of data points in the respective second portion of data points for each additional stage is greater than a number of data points in the first portion of data points and a number of data points in each respective second portion of data points of each previous additional stage.

2. The system of claim 1, wherein each statistical moment of the first stage that has an odd order greater than one is always null.

3. The system of claim 1, wherein:
each compute unit of the first stage outputs a respective statistical moment computed by the compute unit to a corresponding compute unit of a next stage of the one or more additional stages, and
each compute unit of the next stage computes a statistical moment using the first statistical moment received from the corresponding compute unit.

4. The system of claim 1, wherein each additional stage includes a plurality of registers, the plurality of registers including, for each compute unit of the additional stage:
a first register configured to store a most recent statistical moment received from a corresponding compute unit of a previous stage; and
a second register configured to store a second most recent statistical moment received from the corresponding compute unit of the previous stage, wherein the second most recent statistical moment was received immediately prior to the most recent statistical moment.

5. The system of claim 4, wherein each compute unit of the additional stage is configured to compute a respective statistical moment using the most recent statistical moment stored in the first register and the second most recent statistical moment stored in the second register.

6. The system of claim 2, wherein each compute unit of the additional stage that computes a statistical moment having an order of two or higher is further configured to compute the respective statistical moment based on the statistical moment computed by the compute unit of the additional stage that computes a next lower statistical moment for the stage.

7. The system of claim 1, wherein the first compute unit of the first stage is configured to compute (i) a mean of two data points in the time series and (ii) a difference between the two data points, wherein the mean and difference are used by one or more of the one or more first additional compute units in the first stage.

8. The system of claim 1, wherein the second compute unit of the second stage of each additional stage is configured to compute (i) a mean of two data points received from a previous stage and (ii) a difference between the two data points received from the previous stage, wherein the mean and difference are used by one or more of the one or more second additional compute units in the second stage.

9. The system of claim 1, wherein each compute unit of each additional stage that computes a statistical moment having an order of two or higher computes the statistical moment using the following equation:

$$M_X^p = M_{X_1}^p + M_{X_0}^p + \sum_{k=1}^{p} \binom{p}{k} (2^{-k} [M_{X_1}^{p-k} + (-1)^k M_{X_0}^{p-k}] \delta_{2,1}^k,$$

wherein p represents the order of the statistical moment, $X_0$ is a first sub-series of the time series of data points, and $X_1$ is a second subseries of the time series of data points.

10. The system of claim 1, wherein each compute unit of each additional stage that computes a statistical moment having an order of two computes the statistical moment using the following equation:

$$M_{b_{i+1},X}^2 = M_{b_i,X_1}^2 + M_{b_i,X_0}^2 + (2^{b_i-1}) \delta_{2,1}^2,$$

wherein $b_i$ represents a level of the additional stage and $\delta_{2,1} = \mu_{X_1} - \mu_{X_0}$ is a difference between a mean of a second sub-series $X_1$ of the time series of data points and a mean of a second sub-series $X_0$ of the time series of data points received by the additional stage.

11. The system of claim 1, wherein a number of stages in the plurality of stages is based on a largest time period for which statistical moments are computed by the plurality of stages.

12. The system of claim 1, wherein the plurality of stages of compute units are arranged such that a number of data points for which statistical moments are computed by each particular stage is a power of two having a particular exponent for the particular stage.

13. The system of claim 12, wherein the particular exponent for each particular stage is one higher than the particular exponent of an immediate previous stage for the particular stage.

14. The system of claim 1, wherein a number of compute units in each stage equals a number of orders of statistical moments computed by each stage.

15. The system of claim 1, wherein each compute unit of each stage computes a respective statistical moment using hardware components without requiring any floating point division operations.

16. A method for computing statistical moments for a time series of data points, the method comprising:
  computing, by a first compute unit of a first stage of compute units of a plurality of stages of compute units, a first raw statistical moment for a first portion of data points in a time series of data points, wherein the first stage comprises a first sequence of compute units including the first compute unit and one or more additional first compute units;
  computing, by each of the one or more first additional compute units of the first stage of compute units, a respective first statistical moment for the first portion of data points, wherein the respective first statistical moment computed by each first additional compute unit is one order higher than the respective first statistical moment computed by a previous compute unit in the first stage;
  computing, by a second compute unit of each of one or more additional stages of compute units, the first raw statistical moment for a respective second portion of the time series of data points, wherein each additional stage includes a second sequence of compute units for computing statistical moments for the respective second portion of the time series of data points; and
  computing, by one or more second additional compute units of each of the one or more additional stages of compute units, a respective second statistical moment for the respective second portion of the data points, wherein the respective second statistical moment computed by each second additional compute unit is one order higher than the respective second statistical moment computed by a previous compute unit in the additional stage,
  wherein a number of data points in the respective second portion of data points for each additional stage is greater than a number of data points in the first portion of data points and a number of data points in each respective second portion of data points of each previous additional stage.

17. The method of claim 16, wherein:
  each compute unit of the first stage outputs a respective statistical moment computed by the compute unit to a corresponding compute unit of a next stage of the one or more additional stages, and
  each compute unit of the next stage computes a statistical moment using the first statistical moment received from the corresponding compute unit.

18. The method of claim 16, wherein each additional stage includes a plurality of registers, the plurality of registers including, for each compute unit of the additional stage:
  a first register configured to store a most recent statistical moment received from a corresponding compute unit of a previous stage; and
  a second register configured to store a second most recent statistical moment received from the corresponding compute unit of the previous stage, wherein the second most recent statistical moment was received immediately prior to the most recent statistical moment.

19. The method of claim 18, wherein each compute unit of the additional stage is configured to compute a respective statistical moment using the most recent statistical moment stored in the first register and the second most recent statistical moment stored in the second register.

20. The method of claim 18, wherein each compute unit of the additional stage that computes a statistical moment having an order of two or higher is further configured to compute the respective statistical moment based on the statistical moment computed the compute unit of the additional stage that computes a next lower statistical moment for the stage.

* * * * *

UNITED STATES PATENT AND TRADEMARK OFFICE
CERTIFICATE OF CORRECTION

| | | |
|---|---|---|
| PATENT NO. | : 11,269,635 B1 | |
| APPLICATION NO. | : 17/075140 | |
| DATED | : March 8, 2022 | |
| INVENTOR(S) | : Eric Tristan Lemoine | |

It is certified that error appears in the above-identified patent and that said Letters Patent is hereby corrected as shown below:

In the Claims

In Claim 20, Column 26, Line 61, delete "computed the" and insert -- computed by the --.

Signed and Sealed this
Thirtieth Day of July, 2024

Katherine Kelly Vidal
*Director of the United States Patent and Trademark Office*